United States Patent
Takagi

(10) Patent No.: US 7,673,652 B2
(45) Date of Patent: Mar. 9, 2010

(54) HYDRAULIC PRESSURE CONTROL DEVICE FOR AUTOMATIC TRANSMISSION

(75) Inventor: Kiyoharu Takagi, Okazaki (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 1078 days.

(21) Appl. No.: 11/340,701

(22) Filed: Jan. 27, 2006

(65) Prior Publication Data
US 2006/0169338 A1    Aug. 3, 2006

(30) Foreign Application Priority Data
Jan. 31, 2005   (JP) ............................... 2005-022505

(51) Int. Cl.
G05D 7/06      (2006.01)
F16H 61/28    (2006.01)

(52) U.S. Cl. ................ 137/596.16; 137/102; 192/85 R; 475/127

(58) Field of Classification Search ................. 137/102, 137/596, 596.14, 596.16; 192/85 R; 475/127, 475/129
See application file for complete search history.

(56) References Cited

U.S. PATENT DOCUMENTS 3,738,182 A * 6/1973 Kubo et al. .................. 477/117
3,823,621 A * 7/1974 Kubo et al. ............ 137/596.16
4,785,689 A * 11/1988 Iwatsuki et al. ............. 477/161
5,005,444 A * 4/1991 Kimura et al. .............. 477/117
7,282,005 B2 * 10/2007 Shimizu et al. ............. 475/127
7,390,285 B2 * 6/2008 Park et al. ................... 477/127
7,431,678 B2 * 10/2008 Takagi ........................ 477/180
2003/0119618 A1 * 6/2003 Iwata et al. ................. 475/127
2004/0067810 A1 * 4/2004 Fujimine et al. ............ 475/127

FOREIGN PATENT DOCUMENTS

JP    2001-12588 A    1/2001
JP    2002-266995 A    9/2002

* cited by examiner

Primary Examiner—John Rivell
(74) Attorney, Agent, or Firm—Buchanan Ingersoll & Rooney P.C.

(57) ABSTRACT

There is provided a circuit configuration which does not require an additional fail-safe mechanism caused by the addition of a changeover valve in a hydraulic pressure control device for an automatic transmission having a function to directly supply a line pressure and hold (lock) an engaging pressure by combinations of electromagnetic valves and changeover valves.

A changeover valve 20 is disposed between an output port 12 and a feedback port 13 of a linear solenoid valve 10 of the hydraulic pressure control device for an automatic transmission. The changeover valve 20 operates depending on at least an output pressure from the output port, and is switched between (1) a first state (control mode) in which a pressure Pc corresponding to an indicator current is outputted through the linear solenoid valve 10 by bringing the output port into communication with the feedback port, and (2) a second state (lock mode) in which a line pressure PL is outputted through the linear solenoid valve 10 by bringing the feedback port 13 into communication with a drain passage EX and discharging oil from the feedback port.

7 Claims, 9 Drawing Sheets

HYDRAULIC PRESSURE CONTROL DEVICE FOR AUTOMATIC TRANSMISSION

CROSS REFERENCE TO RELATED APPLICATIONS

This application is based on and claims priority under 35 U.S.C. §119 with respect to Japanese Application No. 2005-022505 filed on Jan. 31, 2005, the entire content of which is incorporated herein by reference.

BACKGROUND OF THE INVENTION

1. Field of the Invention

The present invention relates to a hydraulic pressure control device for an automatic transmission, and more specifically, to a hydraulic pressure control device for an automatic transmission having a function to directly supply a line pressure and hold (lock) an engaging pressure by combinations of electromagnetic valves and changeover valves.

2. Description of the Related Art

In recent years, light-weight, compact, and high-torque automatic transmissions have been demanded. This demand has been met by raising a maximum line pressure so as to ensure a torque capacity that does not cause slip of a friction engaging element. However, if the maximum line pressure is raised, the load of an oil pump becomes large. Therefore, there have been efforts to lower the load by providing a throttle valve interlocking with the depressed amount of an accelerator pedal to change the line pressure depending on each torque situation.

Also, if the line pressure is raised, a difference between the maximum torque and the torque of a gear shift region becomes large. Therefore, as descried in JP-A No. 2001-12588, the control gain becomes large and the controllability deteriorates. Thus, these problems are solved in JP-A No. 2001-12588 by performing gear shift in a control range of an electromagnetic valve, etc., and supplying a line pressure to a friction engaging element by using a changeover valve, after completion of the gear shift.

Meanwhile, in JP-A No. 2001-12588, if the changeover valve has stuck (sticking of a valve body) and remains in the state of supplying a line pressure, the friction engaging element cannot be disengaged although a pressure-reducing control valve (or control valve) and a solenoid valve operate normally. In this case, since it is also considered that any interlock is caused unexpectedly, it is necessary to incorporate a fail-safe mechanism that detects sticking of the changeover valve by a hydraulic switch, etc. and forcefully disengages the friction engaging element so that a vehicle can travel.

A hydraulic pressure control device of JP-A No. 2002-266995 is also of a type that performs gear shift in a control range of an electromagnetic valve, etc., and supplies a line pressure to an engaging element by using a changeover valve, after completion of the gear shift. However, the control device is configured such that switching of the changeover valve is performed by an electromagnetic valve (linear solenoid valve), and the electromagnetic valve and the control valve are normally high (normally open), that is, the output pressure thereof is high when power is turned off (refer to FIG. 12).

FIG. 4 is a view showing a state in a case where the changeover valve in a hydraulic circuit of JP-A No. 200-266995 has stuck on the lock side. As indicated by dotted lines in the figure, even when the electromagnetic valve is turned on or off, a line pressure is led to the friction engaging element C-1. Also, FIG. 5 is a view showing a state in a case where the control valve in the hydraulic circuit of JP-A No. 2002-266995 has stuck on the ON-side. Even in this case, as indicated by dotted lines in the figure, even when the electromagnetic valve is turned on or off, a line pressure is led to the friction engaging element C-1. Further, although not shown, even when the electromagnetic valve in the hydraulic circuit of JP-A No. 2002-266995 fails in an ON state, similar to the case in which the changeover valve has stuck on the lock side, a line pressure is led to the friction engaging element C-1.

FIG. 6 is a view showing a state in a case where the electromagnetic valve in the conventional hydraulic circuit of JP-A No. 2002-266995 has failed in an OFF state. In this case, it is natural that the output remains low.

The output should be low in an ON state of the electromagnetic valve, while the output should be high in an OFF state of the electromagnetic valve. However, at the time of abnormality, the output may become high in an ON state of the electromagnetic valve, while the output may become low in an OFF state of the electromagnetic valve. These problems are not caused by installation of the changeover valve. Solutions to these problems have been sought by a hardware failure or a control software failure on a hydraulic circuit using an interlocking valve or a fail-safe valve.

DISCLOSURE OF THE INVENTION

Problems to be Solved by the Invention

Meanwhile, when a recent trend to reduce cost is taken into consideration, a reduction in the number of parts and simplification in the structure of oil passages have been demanded. For example, the hydraulic pressure control device of JP-A No. 2002-266995 requires a modulator valve that supplies a modulator pressure to the electromagnetic valve (linear solenoid valve), the control valve, and the changeover valve (linear solenoid valve). This increases the number of parts and complicates the structure of oil passages.

It is thus considered that the structure of oil passages is simplified and the cost is reduced using a direct pressure type electromagnetic valve (linear solenoid valve) that directly supplies a line pressure to an electromagnetic valve (linear solenoid valve), by eliminating the modulator valve (reference numeral 8 in FIG. 4) and the control valve (reference numeral 6 in FIG. 4).

For example, FIG. 7 shows a hydraulic circuit in which a direct pressure type electromagnetic valve (linear solenoid valve) 10 and a changeover valve 9 equivalent to that in JP-A No. 2002-266995 are used to form an engaging-pressure holding (locking) mechanism. For example, if the direct pressure type solenoid valve is a normally high type electromagnetic valve (linear solenoid valve) 10, when current is not applied, the valve is in a lock mode position where an input port 9a and an output port 9c, directly connected to D-pressure (forward pressure), are communicated with each other. Then, as an indicator current is applied to the electromagnetic valve (linear solenoid valve) 10, at a time when the indicator current exceeds a predetermined value as shown in FIG. 12, the input port 9a is closed, and the input port 9b connected to the electromagnetic valve (linear solenoid valve) 10 and the output port 9c are communicated with each other. Thereafter, the output pressure decreases at a predetermined gradient from a maximum control pressure PcMAX. Finally, a drain port (EX) and the output port are communicated with each other, which renders the output pressure zero.

FIG. 8 is a view showing a state in a case where the changeover valve 9 in the circuit configuration of FIG. 7 has stuck on the lock side. As indicated by dotted lines in the figure, even when the electromagnetic valve is turned on or off, the input port 9a and output port 9c of the changeover valve 9 are kept being communicated with each other, thereby a line pressure is led to the friction engaging element C-1. FIG. 9 is a view showing a state in a case where the solenoid valve (linear solenoid valve) 10 in the circuit configuration of FIG. 7 has failed in an ON state or has failed due to disconnection. As indicated by dotted lines in the figure, similar to FIG. 8, the input port 9a and output port 9c of the changeover valve 9 are kept being communicated with each other, thereby a line pressure is led to the friction engaging element C-1.

As such, by using the normally high type (normally open type) electromagnetic valve (linear solenoid valve) 10, even if the changeover valve 9 has stuck on the lock side and a situation ensues in which the state of the electromagnetic valve is not consistent with the output pressure, this problem can be solved by operating a fail-safe mechanism equivalent to that at the time of a disconnection failure. Thus, it is possible to solve the problems by a hardware failure on a hydraulic circuit using a fail-safe valve or a control software failure, similar to a so-called conventional art (JP-A No. 2002-266995).

However, in a case where the normally low type (normally closed type) electromagnetic valve (linear solenoid valve) 10 is required, including a case where the normally high type (normally open type) electromagnetic valve is used in some friction engaging elements only and the normally low type (normally closed type) electromagnetic valve is used in the other friction engaging elements, it is believed that the following problems will occur.

For example, FIG. 10 shows a hydraulic circuit in which a normally-low (normally-closed), direct pressure type electromagnetic valve (linear solenoid valve) 10 and a changeover valve 9 equivalent to that in JP-A No. 2002-266995 are used to form an engaging-pressure holding (locking) mechanism. In this circuit, when current is not applied, a drain port (EX) and an output port are communicated with each other and the output pressure is zero. Then, as an indicator current is applied to the electromagnetic valve (linear solenoid valve) 10, the input port 9b and the output port 9c are communicated with each other. Thereafter, the output pressure to the friction engaging element C-1 increases at a predetermined gradient until it reaches the maximum control pressure PcMAX. Then, at a point of time when the indicator current exceeds a predetermined value, the input port 9b is closed, and the input port 9a connected to the D-pressure (forward pressure) and 9c are communicated with each other. Thereafter, the line pressure PL is maintained.

FIG. 11 is a view showing a state in a case where the changeover valve 9 in the circuit configuration of FIG. 10 has stuck on the lock side. As indicated by dotted lines in the figure, even when the electromagnetic valve is turned on or off, the input port 9a and output port 9c of the changeover valve 9 are kept communicated with each other, thereby a line pressure may be led to the friction engaging element C-1. Although there is no problem in an ON state of the electromagnetic valve (the output is high in an ON state of the electromagnetic valve), a state reversed to an electrical disconnection failure (the output is high in an OFF state of the electromagnetic valve) may occur in an OFF state of the electromagnetic valve.

To be brief, in the related art, a directly-connected oil passage under the line pressure and an output oil passage of the solenoid valve are switched by the changeover valve so as to be connected to the friction engaging element. Therefore, a problem occurs in that the line pressure might be outputted, although the normally low type linear solenoid valve is in an OFF state, depending on a state of the changeover valve.

In order to cope with this, a fail-safe valve is required that cuts off hydraulic oil to the friction engaging element C-1 in a region where the output pressure of the electromagnetic valve (linear solenoid valve) 10 is low. Also, considering that a region with a high output pressure is used to operate the changeover valve 9, a region that can be used in a control region is further reduced, and one fail-safe valve is required for one electromagnetic valve of normally low type (normally closed type). As a result, advantages of the direct pressure type linear solenoid valve may be lost.

SUMMARY OF THE INVENTION

The present invention has been made in consideration of the above circumstances. It is therefore an object of the invention to provide a circuit configuration that does not require an additional fail-safe mechanism caused by the addition of a changeover valve, in a hydraulic pressure control device for an automatic transmission having a function to directly supply a line pressure and hold (lock) an engaging pressure by combinations of electromagnetic valves and changeover valves.

According to a first aspect of the present invention, there is provided a hydraulic pressure control device for an automatic transmission that controls engagement and disengagement of a friction engaging element, which is comprising, a linear solenoid valve inputted with a line pressure and outputting a output pressure by modulating the line pressure, and a changeover valve switching oil passages to the linear solenoid valve, wherein, the linear solenoid valve has an input port to which the line pressure is inputted, an output port from which an output pressure is outputted and a feedback port to which the output pressure is inputted for modulating the output pressure, further wherein, the changeover valve which is disposed in an oil passage between the output port and the feedback port, communicating the feedback port with the output port in a first state where the output pressure proportional to an control current is outputted, communicating the feedback port with the other oil passages for introducing the line pressure in a second state where the line pressure is outputted as the output pressure.

According to the present invention, it is possible to employ a simplified oil passage structure with a small number of parts not only in a case where a normally high type (normally open type) electromagnetic valve is used, but also in a case where a normally low type (normally closed type) electromagnetic valve is used. The reason is that it is not necessary to incorporate a fail-safe mechanism against sticking of the changeover valve, thereby making a full use of advantages of the direct pressure type electromagnetic valve.

DESCRIPTION OF THE PREFERRED EMBODIMENTS

Figure 1:
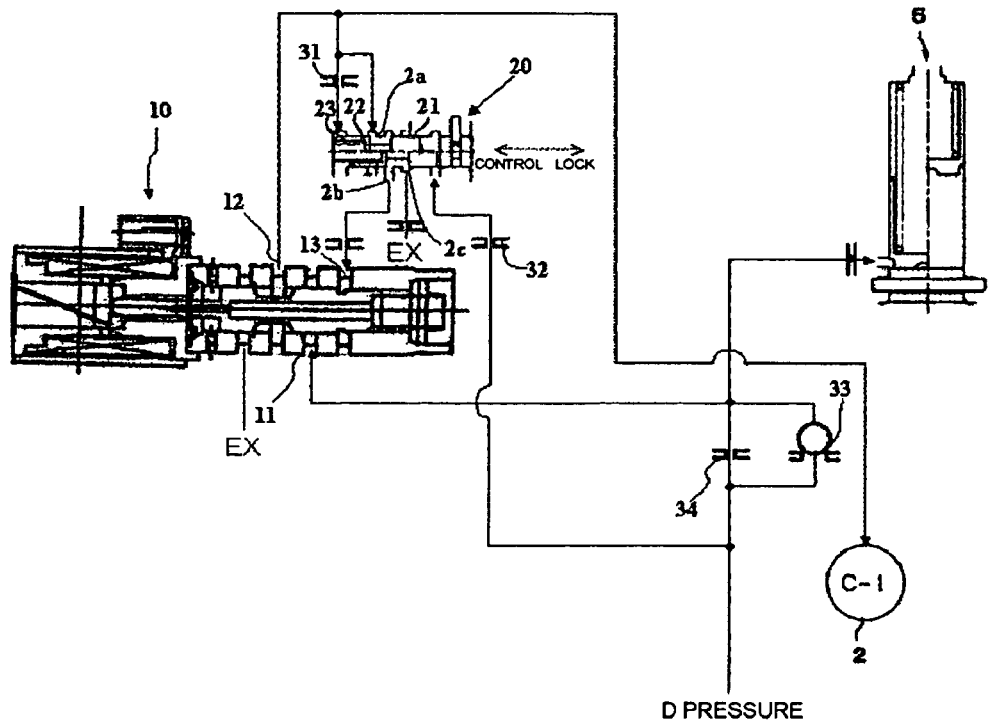
FIG. 1 is a view showing the circuit configuration of a hydraulic pressure control device for an automatic transmission relating to an embodiment of the invention.

In the following, a best mode for implementing the present invention will be described. FIG. 1 is a view showing a portion relating to a clutch C-1, in the circuit configuration of a hydraulic pressure control device for an automatic transmission relating to the present embodiment. Referring to FIG. 1, the hydraulic pressure control device includes a hydraulic servo 2 that operates a friction engaging element (for example, a clutch C-1), an accumulator 5 that is disposed on the downstream side of a backflow throttle circuit composed of a check ball valve 33 and an orifice 34 which are parallel to each other, a direct pressure type linear solenoid valve 10 that is connected to a manual valve (not shown) through the backflow throttle circuit to supply the hydraulic servo 2 with hydraulic oil, and a changeover valve 20 that is disposed in a feedback oil passage of the linear solenoid valve 10 capable of being switched between oil passages by operating a valve member within the valve.

The linear solenoid valve 10 is connected with a forward range pressure port of the manual valve (not shown), and an output port 12 of the linear solenoid valve 10 is connected to the hydraulic servo 2, and controlled by an ECU (not shown) according to the operating state of a vehicle, whereby the operation of the clutch C-1 is controlled. In addition, although the linear solenoid valve 10 will be described below as a normally low type solenoid valve (output pressure is zero in a normal state without power supply for solenoid part, and hydraulic oil is supplied to an output oil passage according to an indicator current), the invention can also be equally applied to a normally high type solenoid valve. Therefore, the normally high type solenoid valve will also be mentioned as necessary.

The linear solenoid valve 10 is provided with a feedback port 13 that is connected to a feedback port 2b of a changeover valve disposed in a feedback oil passage branched from an oil passage extending from the output port 12 to the hydraulic servo 2.

The changeover valve 20 is provided with a spool having at its one end a pressure-receiving portion (an end surface of a land 21) which receives a forward pressure (D-pressure) through an orifice 32 and having at its other end a pressure-receiving portion (end surface of a land 22) that receives the hydraulic pressure from the output oil passage of the solenoid valve 10 through the orifice 31, and is operated using the line pressure to be outputted as the forward pressure (D-pressure) and the output pressure of the linear solenoid valve operate as switching signals. The forward pressure (D-pressure) acts against or in opposition to a biasing force of a spring 23. Since the spool is biased toward the lock side by the spring 23 that is a biasing means, switching is performed by balancing between (line pressure×valve diameter) and (output pressure of linear solenoid valve×valve diameter+spring force).

[Normal State]

Next, the operation of the present embodiment will be described. In the present embodiment, since the linear solenoid valve 10 is of a normally low type, and in a normal state, (line pressure×valve diameter) surpasses (output pressure of linear solenoid valve×valve diameter+spring valve), the spool of the changeover valve 20 is positioned on the control side.

Figure 13:
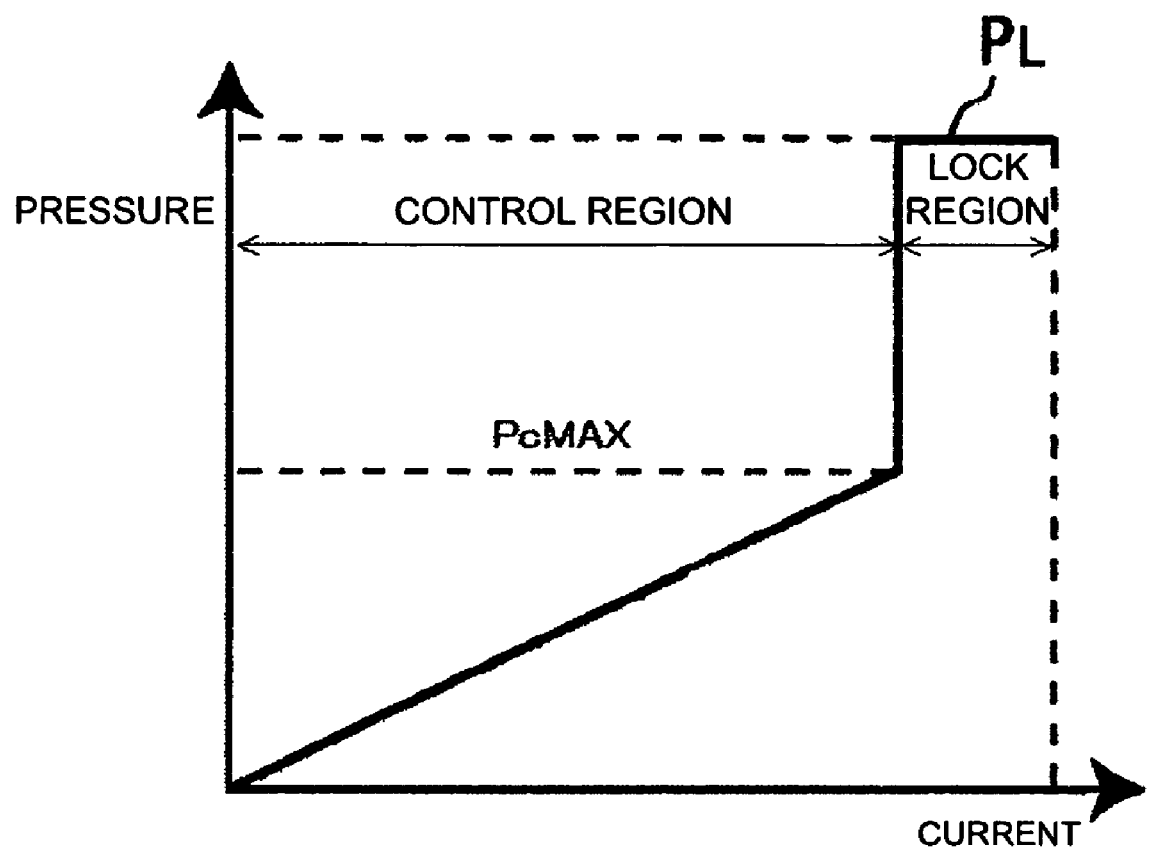
FIG. 13 is a characteristics diagram showing a state where a required torque capacity and controllability are made compatible using a normally closed type linear solenoid.

In this state, if an indicator current is applied to the linear solenoid valve 10, the hydraulic pressure outputted from the output port 12 of the linear solenoid valve 10 is also fed back to the feedback port 13 of the linear solenoid valve 10, thereby the output pressure increases gradually at a predetermined gradient (see FIG. 13).

Also, if the indicator current to the linear solenoid valve 10 exceeds a predetermined value, (output pressure of linear solenoid valve×valve diameter+spring force) surpasses (line pressure×spring force), the spool of the changeover valve 20 starts to move and is finally positioned on the lock side.

If the spool of the changeover valve 20 is positioned on the lock side, the oil passage extending from the output port 12 of the linear solenoid valve 10 to the feedback port 13 is cut off, and the feedback port 13 is communicated with a drain port 2c of the changeover valve 20. Accordingly, the hydraulic pressure inputted to the input port 11 of the linear solenoid valve 10 is brought into a state where it is supplied to the hydraulic servo 2 with no reduction in the pressure (line-pressure locked state).

Thereafter, for example, if the indicator current applied to the solenoid valve 10 becomes zero, output pressure of the linear solenoid valve is reduced while the valve is throttled, thereby the spool of the changeover valve 20 returns to the control side.

As described above, since the line pressure, the linear solenoid valve, and the friction engaging element are connected to one another in series in the named order, and the manner in which the feedback oil passage of the linear solenoid valve is brought into a communication state or to be in a drain state is composed to be switched by the linear solenoid valve itself, the linear solenoid valve is provided two functions of an operation mode changeover function and a pressure-regulating function.

Figure 12:
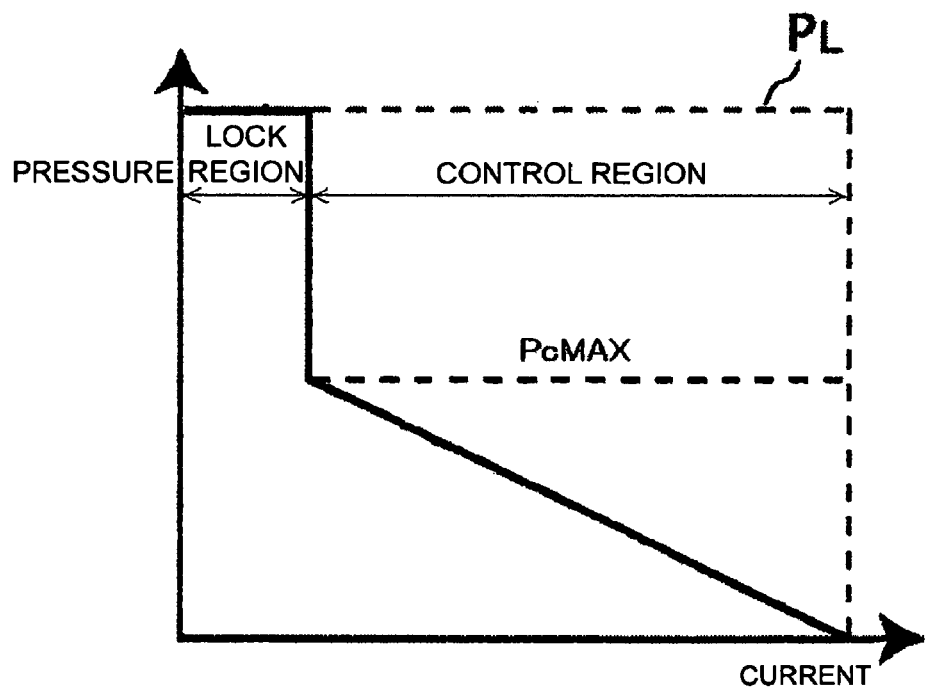
FIG. 12 is a characteristics diagram showing a state where a required torque capacity and controllability are made compatible using a normally open type linear solenoid.

In addition, in a case where the normally high type linear solenoid valve 10 is used, the operation reversed to the above is performed. Specifically, in an initial state, the changeover valve 20 is in a locked position. If the indicator current exceeds a predetermined value, the changeover valve moves and enter a control mode. Then, the hydraulic pressure outputted from the output port 12 of the linear solenoid valve 10 is also fed back to the feedback port 13 of the linear solenoid valve 10, thereby the output pressure decreases gradually at a predetermined gradient (see FIG. 12).

[Sticking of Changeover Valve on the Control Side]

Figure 2:
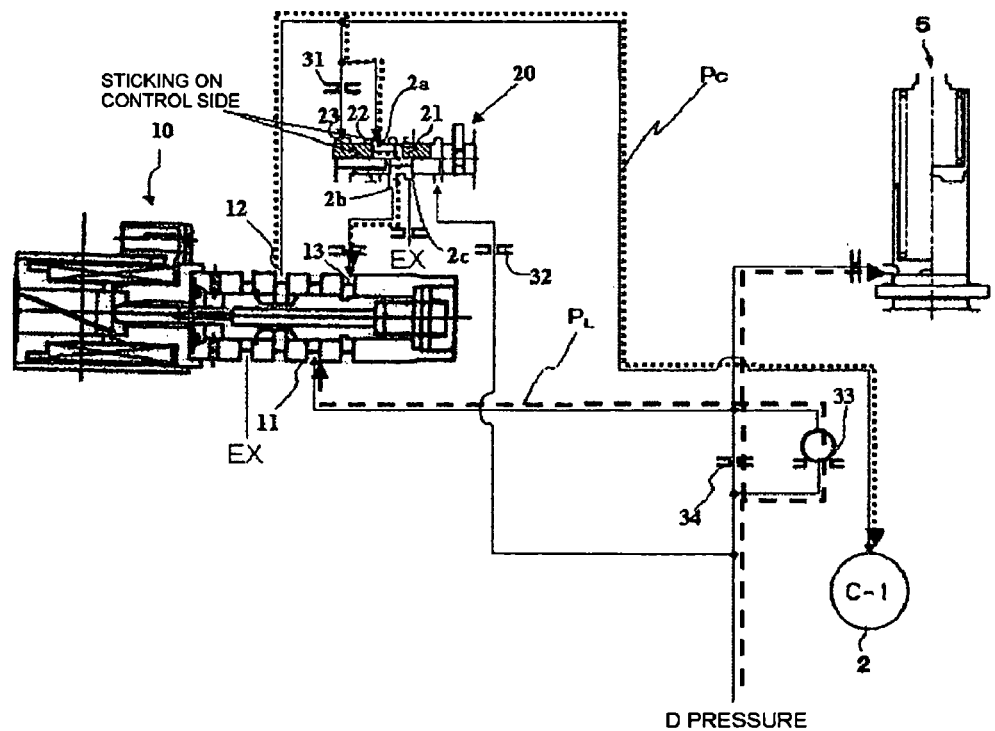
FIG. 2 is a view for explaining a state in a case where a changeover valve of the hydraulic pressure control device for an automatic transmission of FIG. 1 has stuck on the control side.

FIG. 2 is a view for explaining a state in a case where the changeover valve of the hydraulic pressure control device for an automatic transmission relating to the present embodiment has stuck on the control side. If an indicator current is applied to the linear solenoid valve 10, the hydraulic pressure outputted from the output port 12 of the linear solenoid valve 10 is also fed back to the feedback port 13 of the linear solenoid valve 10, thereby the output pressure Pc (indicated by dotted lines) increases gradually at a predetermined gradient, but the spool of the changeover valve 20 remains positioned on the control side.

In this state, since the feedback of the output pressure of the linear solenoid valve is performed, the line pressure PL cannot be outputted. However, PcMAX can be outputted as a maximum pressure, and thus an engaging pressure can be obtained to such a degree that a vehicle can travel.

Further, a case in which an OFF failure or a disconnection is caused in the normally low type linear solenoid valve 10 is similar to the case in FIG. 2, and the line pressure PL cannot be outputted. However, PcMAX can be outputted as a maximum pressure, and thus an engaging pressure can be obtained to such a degree that a vehicle can travel.

In addition, a case in which an ON failure is caused in the normally high type linear solenoid valve is similar to the case in FIG. 2, and the line pressure PL cannot be outputted. However, PcMAX can be outputted as a maximum pressure, and thus an engaging pressure can be obtained to such a degree that a vehicle can travel.

[Sticking of Changeover Valve on the Lock Side]

Figure 3:
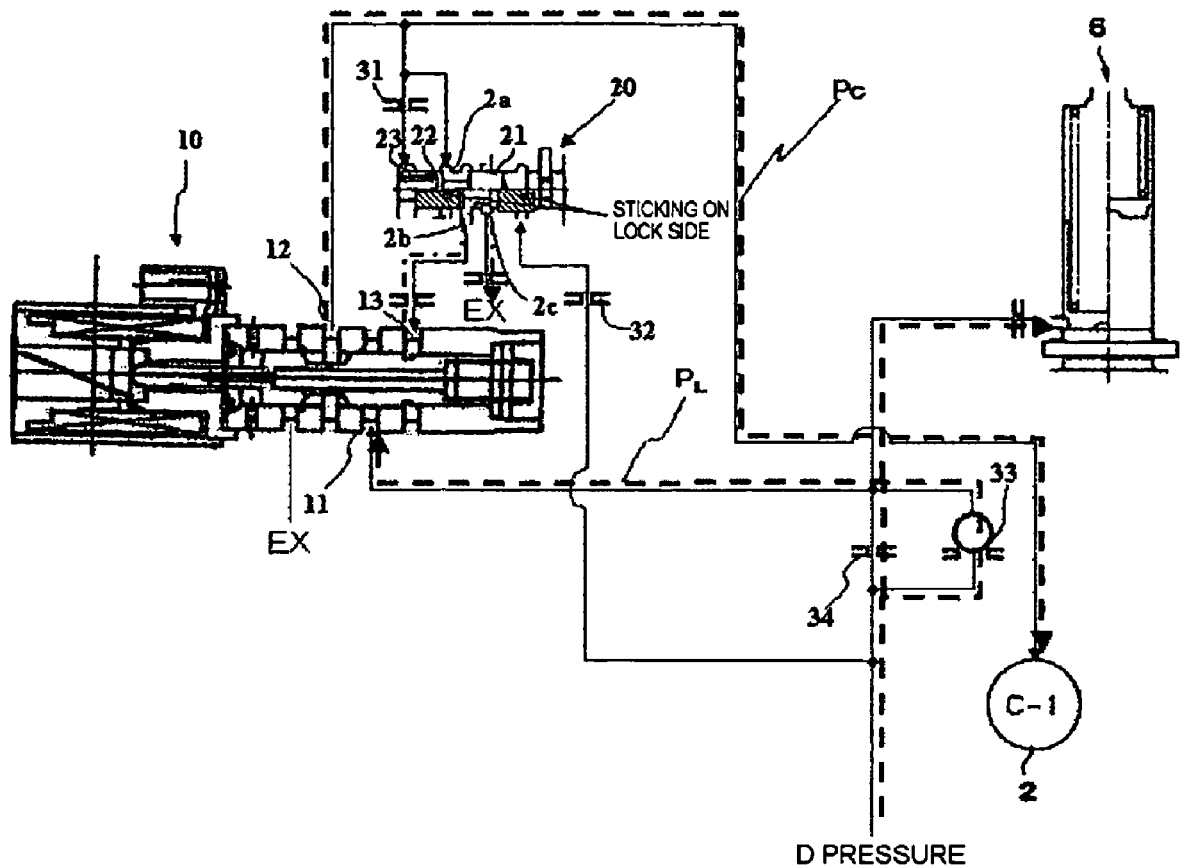
FIG. 3 is a view for explaining a state in a case where the changeover valve of the hydraulic pressure control device for an automatic transmission of FIG. 1 has stuck on the lock side.
Figure 4:
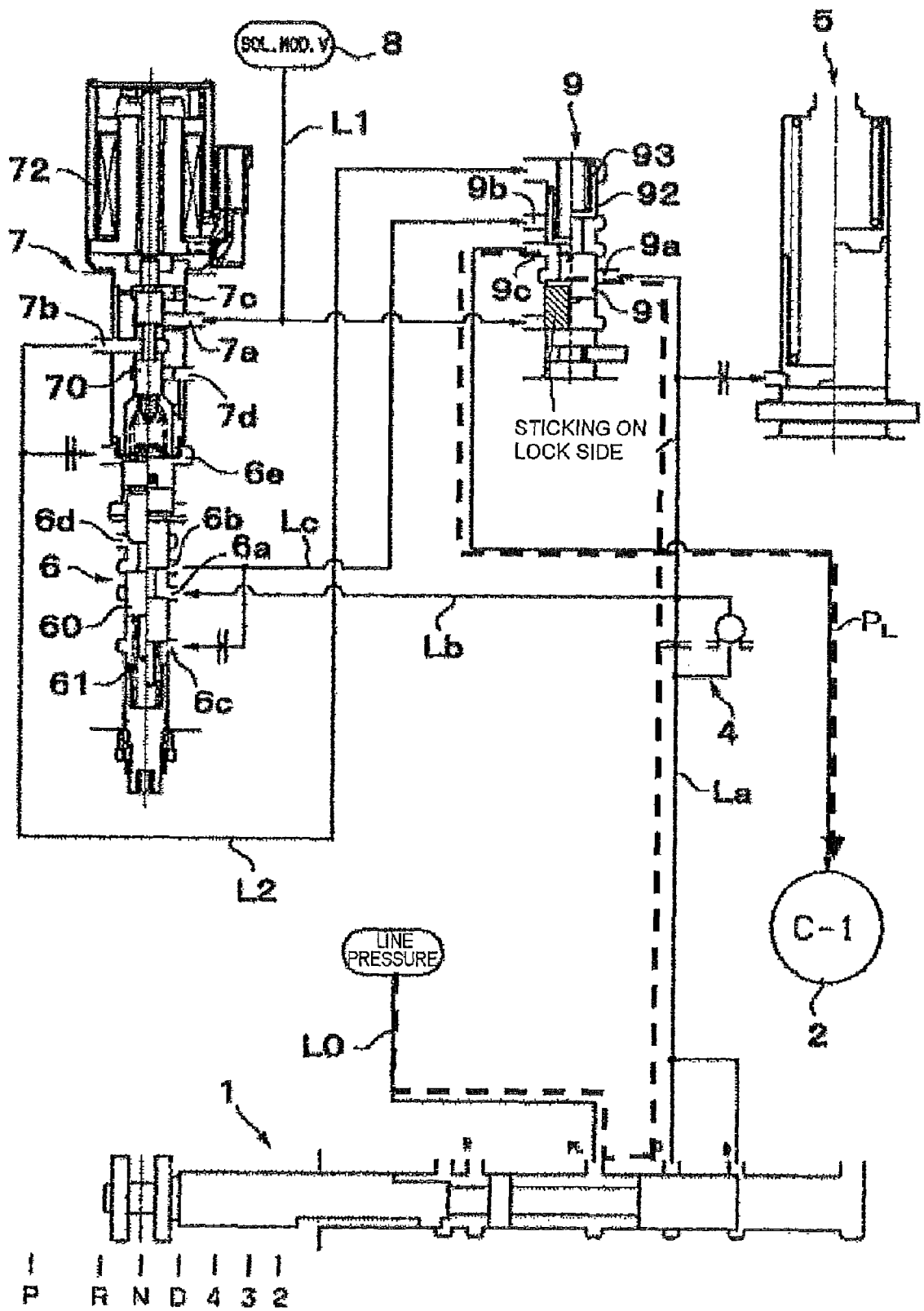
FIG. 4 is a view showing a state in a case where a changeover valve in a conventional hydraulic circuit has stuck on the lock side.
Figure 5:
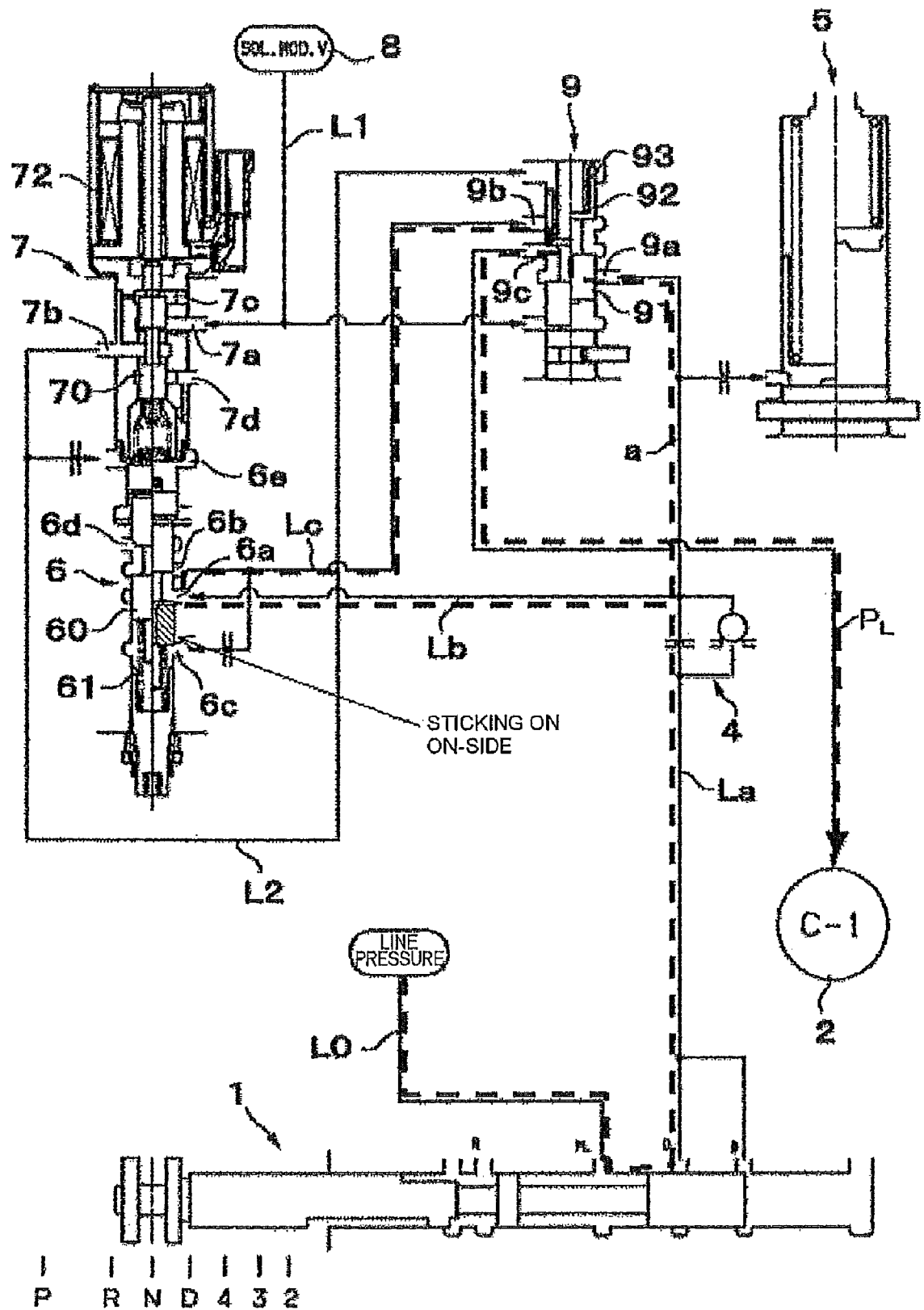
FIG. 5 is a view showing a state in a case where a control valve in the conventional hydraulic circuit has stuck on the ON-side.
Figure 6:
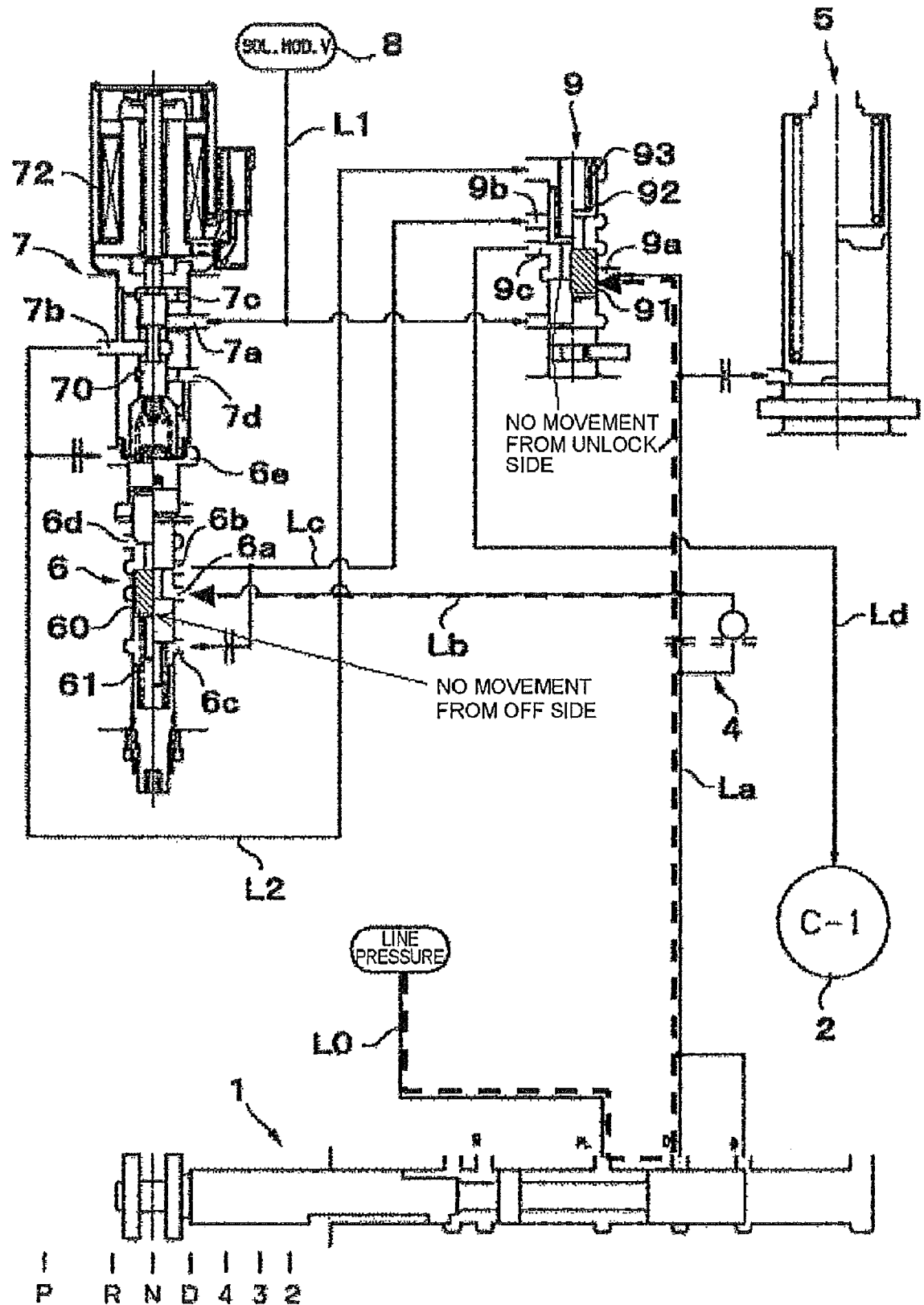
FIG. 6 is a view showing a state in a case where an electromagnetic valve in the conventional hydraulic circuit has failed in an OFF state.
Figure 7:
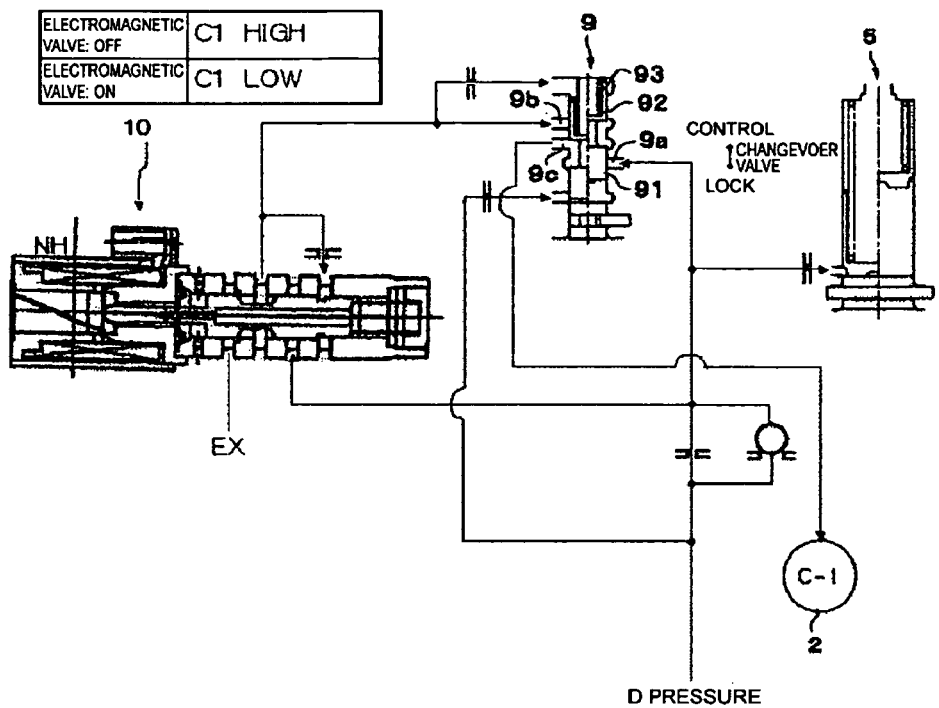
FIG. 7 is a view showing the circuit configuration of a hydraulic pressure control device for an automatic transmission having a changeover valve that is switched between the output of a normally open type linear solenoid valve and a directly connected oil passage.
Figure 8:
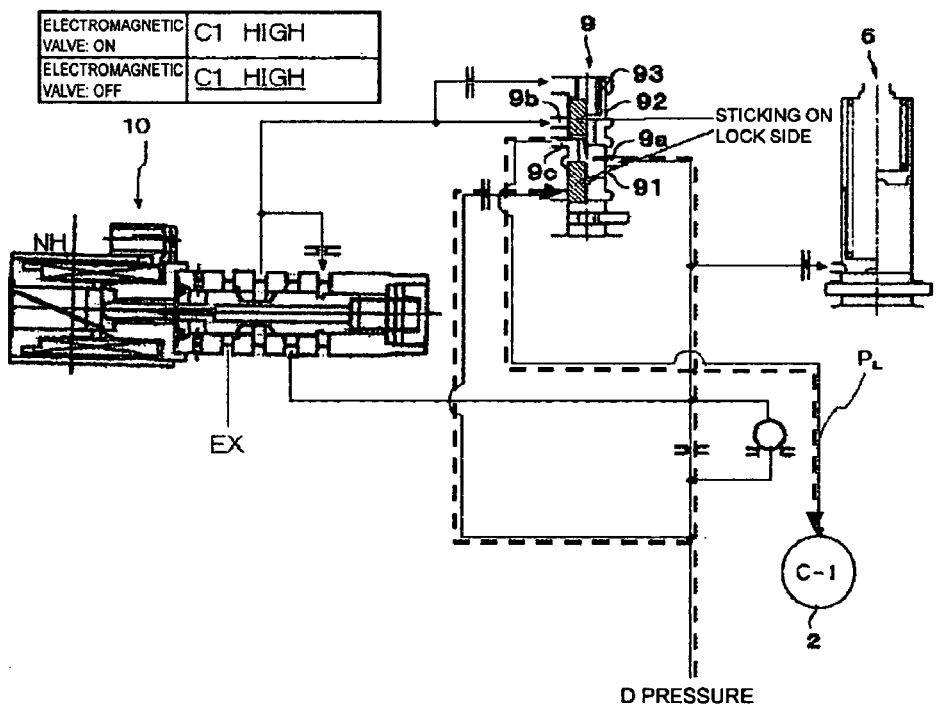
FIG. 8 is a view showing a state in a case where the changeover valve in the circuit configuration of FIG. 7 has stuck on the lock side.
Figure 9:
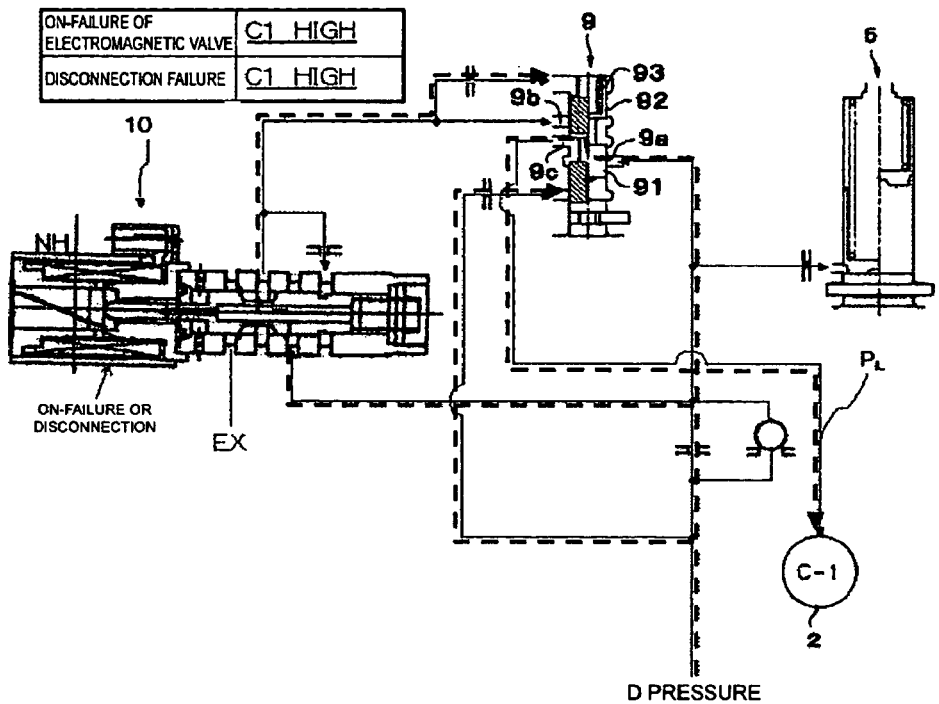
FIG. 9 is a view showing a state in a case where the linear solenoid valve in the circuit configuration of FIG. 7 has failed in an OFF state or has failed due to breaking of wires.
Figure 10:
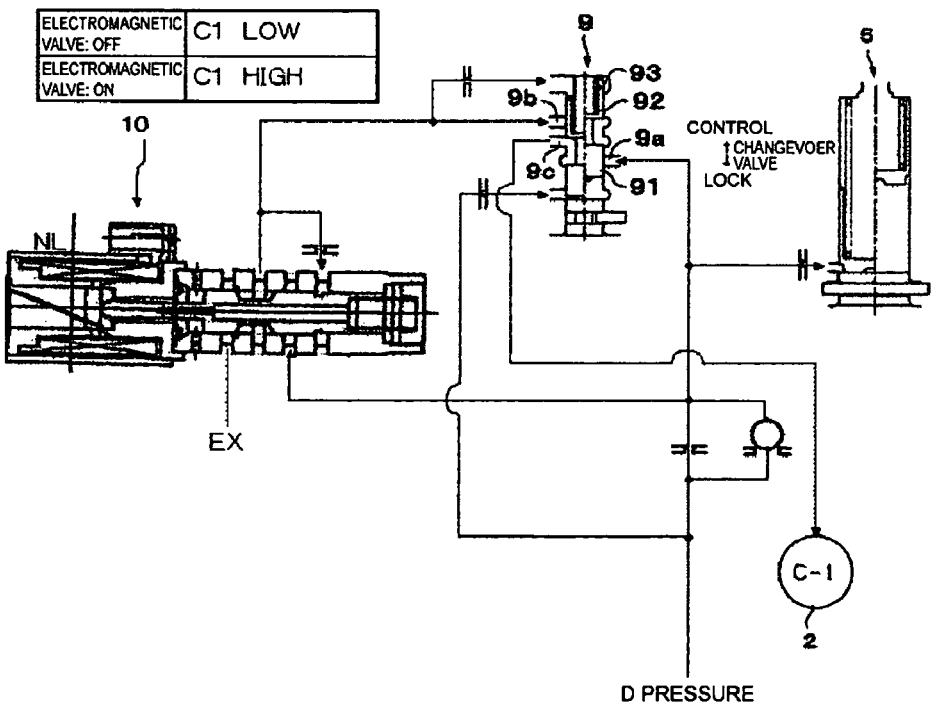
FIG. 10 is a view showing the circuit configuration of a hydraulic pressure control device for an automatic transmission having a changeover valve that is switched between the output of a normally closed type linear solenoid valve and a directly connected fluid passage.
Figure 11:
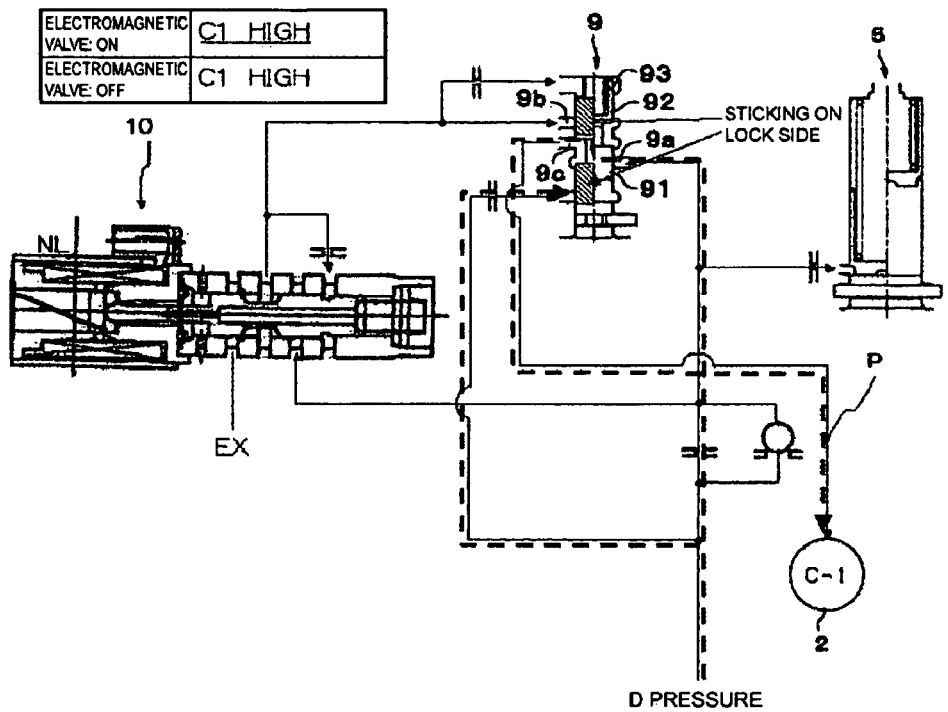
FIG. 11 is a view showing a state in a case where the changeover valve in the circuit configuration of FIG. 10 has stuck on the lock side.

FIG. 3 is a view for explaining a state in a case where the changeover valve of the hydraulic pressure control device for an automatic transmission relating to the present embodiment has stuck on the lock side. If the changeover valve 20 operates and the spool has stuck on the lock side, the feedback oil passage is cut off, and the line pressure PL (indicated by broken lines) is outputted to the hydraulic servo 2.

In this state, since the feedback oil passage is kept closed, only ON/OFF control of the line pressure PL can be performed. However, the friction engaging element C-1 can be disengaged by turning off the linear solenoid valve 10.

In the normally low type linear solenoid valve 10, in the case of an OFF failure or a disconnection failure, the friction engaging element C-1 is naturally disengaged, and in the case of an ON failure, the friction engaging element C-1 is engaged and consequently its state coincides with the state of the linear solenoid valve 10.

Further, in the normally high type linear solenoid valve, in the case of an OFF failure or a disconnection failure, the friction engaging element C-1 is engaged, and in the case of an ON failure, the friction engaging element C-1 is disengaged and consequently its state coincides with a command state to the linear solenoid valve 10.

The relation between the command state and output results of the linear solenoid valve described above is the same as that in a case where the linear solenoid valve is solely used without installing the changeover valve. This means that the same fail-safe mechanism as a conventional one used in the case of an ON/OFF failure in hardware or an electrical disconnection failure can be used similarly. Accordingly, since the circuit is simplified and the number of parts is reduced, providing a new fail-safe mechanism is not needed even when the normally low type linear solenoid valve is used.

For example, when an automatic transmission with a maximum line pressure of 1200 kPa requires an engaging pressure of 1500 kPa, it is necessary for the direct pressure type linear solenoid valve to set a gain (loss) by changing the pressure-receiving area of the valve. Therefore, the linear solenoid might be in a separate specification, which is not preferable when production cost is taken into consideration. However, as described above, the maximum torque can be locked to the line pressure, and a control according to a low gain (loss) can be performed during gear shift.

Although the present invention has been described in detail by illustrating a preferred embodiment thereof, the technical scope of the invention is not to be construed as limited to the particular embodiment. The present invention is applicable to various apparatuses by changing structural details and particulars in various ways within the scope of the matters as defined in the claims. For example, although in the above embodiment, the diameter of the spools (lands 21, 22) of the changeover valve 20 is described to be the same, it is also possible to change a balance in switching depending on the output pressure of the linear solenoid valve, for example, by providing a difference between the pressure-receiving areas. Otherwise, various modifications can be employed without impairing the essence of the invention.

Also, in the above embodiment, it is explained that, when the changeover valve 20 operates to some extent, the feedback port 13 of the linear solenoid valve 10 is communicated with the drain port 2c of the changeover valve 20, thereby the feedback pressure is discharged. However, it is also possible to employ a configuration in which the same operation is performed such that the feedback is made inoperative by connecting the feedback port to the line pressure rather than to the drain port, thereby introducing the line pressure into the feedback port.

What is claimed is:

1. A hydraulic pressure control device for an automatic transmission that controls engagement and disengagement of a friction engaging element, comprising:

a linear solenoid valve having an input port to which the line pressure is inputted, an output port from which an output pressure is outputted and a feedback port to which the output pressure is inputted for modulating the output pressure, and a changeover valve disposed in an oil passage between the output port and the feedback port, communicating the feedback port with the output port in a first state where the output pressure proportional to an control current is outputted, and introducing the line pressure to the feed back port in a second state where the line pressure is outputted as the output pressure.

2. The hydraulic pressure control device for an automatic transmission according to claim 1, comprising an oil passage to supply the line pressure to one end of the changeover valve, an oil passage to supply an output pressure of the linear solenoid valve to the other end of the changeover valve, a biasing means to bias the changeover valve in the direction of either state according to a difference between the line pressure and the output pressure or to a difference in a working area between the line pressure and output pressure, and a structure that enables the changeover valve to be operative by at least the output pressure from the output port.

3. The hydraulic pressure control device for an automatic transmission according to claim 1, wherein a backflow throttle circuit having an orifice and a check ball valve arranged in parallel is disposed in an oil passage between a hydraulic source of the line pressure and an input port of the linear solenoid valve.

4. The hydraulic pressure control device for an automatic transmission according to claim 3,
wherein the backflow throttle circuit is connected to an accumulator.

5. The hydraulic pressure control device for an automatic transmission according to claim 4,
wherein the output port of the linear solenoid valve is connected to a hydraulic servo.

6. The hydraulic pressure control device for an automatic transmission according to claim 2,
wherein an orifice is disposed in the oil passage that supplies the line pressure to one end of the changeover valve.

7. The hydraulic pressure control device for an automatic transmission according to claim 6,
wherein an orifice is disposed in the oil passage that supplies the output pressure of the linear solenoid valve to the other end of the changeover valve.

* * * * *